United States Patent
Yang et al.

(10) Patent No.: US 9,091,356 B2
(45) Date of Patent: Jul. 28, 2015

(54) IMPELLER TYPE WATER-HAMMER PROOF AND SILENT CHECK VALVE

(75) Inventors: Jiyue Yang, Guangdong (CN); Hongbin Huang, Guangdong (CN)

(73) Assignee: GUANGDONG LIANSU TECHNOLOGY INDUSTRIAL CO., LTD., Foshan (CN)

(*) Notice: Subject to any disclaimer, the term of this patent is extended or adjusted under 35 U.S.C. 154(b) by 861 days.

(21) Appl. No.: 13/320,434

(22) PCT Filed: Jan. 15, 2010

(86) PCT No.: PCT/CN2010/070215
§ 371 (c)(1),
(2), (4) Date: Nov. 14, 2011

(87) PCT Pub. No.: WO2011/079536
PCT Pub. Date: Jul. 7, 2011

(65) Prior Publication Data
US 2012/0057964 A1    Mar. 8, 2012

(30) Foreign Application Priority Data
Dec. 31, 2009    (CN) .......................... 2009 1 0214544

(51) Int. Cl.
| F16K 47/02 | (2006.01) |
| F16K 15/06 | (2006.01) |
| F16K 1/12  | (2006.01) |
| F16K 15/02 | (2006.01) |
| F16K 47/12 | (2006.01) |

(52) U.S. Cl.
CPC .............. *F16K 15/063* (2013.01); *F16K 1/126* (2013.01); *F16K 15/026* (2013.01); *F16K 47/023* (2013.01); *F16K 47/12* (2013.01)

(58) Field of Classification Search
CPC ..... F16K 15/026; F16K 47/14; F16K 16/063; F16K 1/261; F16K 47/12

USPC ........... 137/514, 484.2, 331, 536, 514.3, 808, 137/543.15, 540, 542, 543, 543.19, 533.19; 251/126

See application file for complete search history.

(56) References Cited

U.S. PATENT DOCUMENTS 3,356,103 A * 12/1967 Biello et al. ............... 137/515.5
5,090,446 A *  2/1992 Hunter et al. ................ 137/540
5,113,900 A *  5/1992 Gilbert ....................... 137/515.5

FOREIGN PATENT DOCUMENTS

| CN | 2153686 Y  | 1/1994  |
| CN | 2196718 Y  | 5/1995  |
| CN | 2346999 Y  | 11/1999 |
| CN | 2358299 Y  | 1/2000  |
| JP | 11241621 A | 9/1999  |

OTHER PUBLICATIONS

International Search Report for PCT/CN2010/070215, dated Oct. 21, 2010.

* cited by examiner

*Primary Examiner* — Kevin Lee
*Assistant Examiner* — P. Macade Nichols
(74) *Attorney, Agent, or Firm* — Pearne & Gordon LLP

(57) ABSTRACT

An impeller type water-hammer proof and silent check valve includes a shell, a sealing ring, a cowl, a flow guide body and a spring. Turbulent-flow blades are provided on the outer surface of the flow guide body. Two groups of axial-flow blades are arranged in the flow passage, and the blades are fixed on the streamline outer surface. The valve continuously converts pressure energy and kinetic energy to a torque surrounding an axial direction to the flow guide body during a process of backflow liquid flowing through the turbulent-flow blades. The valve forms a pair of torques counteracting each other as the turbulent-flow directions of the two groups of blades are opposite. The liquid pressure energy and kinetic energy are continuously and gradually converted to the torque to the flow guide body in the turbulent-flow blades, so that an abrupt impact to the valve by the water hammer is eliminated.

7 Claims, 3 Drawing Sheets

IMPELLER TYPE WATER-HAMMER PROOF AND SILENT CHECK VALVE

The present application is the national phase of International Application No. PCT/CN2010/070215, titled "IMPELLER TYPE WATER-HAMMER PROOF AND SILENT CHECK VALVE", filed on Jan. 15, 2010, which claims the benefit of priority to Chinese patent application No. 200910214544.7 titled "IMPELLER TYPE WATER-HAMMER PROOF AND SILENT CHECK VALVE", filed on Dec. 31, 2009. The entire disclosure thereof is incorporated herein by reference.

FIELD OF THE INVENTION

The invention belongs to the filed field of check valve manufacture, particularly relates to an impeller type water-hammer proof and silent check valve.

BACKGROUND OF THE INVENTION

Check valve is a basic element of fluid control engineering and is applied very widely, playing a role of protecting other fluid machines and pipelines by stopping back flow of fluid. In the traditional check valve, a valve plate closes very fast, and the check valve generally mounted on the pipeline connected with the outlet end of a pump and closes to the outlet end of the pump for preventing back flow of fluid in the pipeline from damaging the pump, thereby protecting the pump. Currently, swing check valve and lifting check valve are commonly used in pipeline systems. Water hammer occurs in the pipeline system when a downstream valve is closed suddenly, and the check valve automatically closes due to flow break in the pipeline, so water hammer waves directly act on the check valve, and will damage the valve in severe case. The failure of a check valve is usually connected to water hammer accidents. Fast opening and closing of the check valve will cause water hammer which will damage the check valve, resulting in chain reaction in a loop and damage of more fluid parts (including other check valves) and thus making accidents more serious. The vicious circle will lead to serious consequence whichever link it starts.

The traditional check valves, no matter swing check valve, lifting check valve or inclined-disc type check valve, have a common characteristic that a valve plate is always in acceleration process during opening and closing such that moving parts of the check valve move too fast before stop, that is the direct cause of water hammer and valve clack impact of the check valve. In order to solve the problems of water hammer and valve clack impact of the check valve, three check valves which have dampers are developed: mechanical damped check valve, hydraulic damped check valve and hybrid damped check valve. The mechanical damped check valve has the advantage that the damping characteristic of the damper is easy to set through mechanical structures and the disadvantage that with the increase of flow velocity and flow quantity of fluid in a pipeline, the relative damping mechanism becomes huge and complex, and with the widening of variation domain of flow velocity and flow quantity in the pipeline, the opening-closing characteristics of the check valve at low flow velocity and quantity are deteriorated seriously (the check valve can not open and close normally in the condition of low flow velocity and quantity). The hydraulic damped check valve employs a special structure, such that the moving parts of the valve must do work to some part of fluid during opening and closing so as to reduce the kinetic energy of the moving parts, achieving the object of prolonging closure time and relieving valve clack impact. The scheme has the advantage that the check valve has simple structure and high operation reliability and disadvantages that the movement of fluid in the valve body is complex, the hydraulic damping characteristics are difficult to meet requirements through parametric design, design cost is high, and because damping of the hydraulic damper is increased with the increase of flow velocity and flow quantity in the pipeline, the hydraulic damped check valve has certain defects for high-flowrate pipelines having lower limit request on pipeline size. The hybrid damped check valve is a design combining the mechanical damped check valve and the hydraulic damped check valve, which optimizes the opening-closing characteristics of the check valve through complementary advantages. According to patens at home and abroad, this scheme have failed to make a breakthrough. A common shortcoming of damped check valves is that slow closing of the valve plate is liable to cause back flow of a part of water into a water pump, resulting in reverse rotation of the water pump.

In addition to the above check valves, there are silent check valve, direct impact check valve, water-hammer proof spherical check valve, etc. The silent check has low noise of closing because of short moving distance of the valve plate but can not avoid water hammer; actually, the direct impact check valve belongs to hydraulic damped check valves; and the spherical check valve has favorable water-hammer proof effect, but has high manufacture cost due to excessive complex structure and more sealing surfaces.

SUMMARY OF THE INVENTION

The object of the invention is to provide an impeller type water-hammer proof and silent check valve having simple structure and capable of effectively reducing concentrated impact of water hammer energy to the valve at the axial direction to overcome the defects of the prior art.

In order to realize the object, the invention employs the following technical scheme:

An impeller type water-hammer proof and silent check valve comprises a shell, a sealing ring, a cowl, a flow guide body and a spring, and turbulent-flow blades are arranged on the outer surface of the flow guide body.

By arranging the turbulent-flow on the outer surface of the flow guide body, the impact of backflow water to the check valve is buffered in the invention. And the impact force of the water flow further is weakened, even counteracted.

Furthermore, the invention is provided with several turbulent-flow blades which are evenly distributed on the outer surface of the flow guide body. With the turbulent-flow blades evenly distributed on the outer surface of the flow guide body, the water hammer resistance is more even and more effective.

In the above technical scheme, said turbulent-flow blade is a sheet body with a cross section of a curve.

Furthermore, the turbulent-flow blade is in the shape of an "S".

The direction of both ends of the turbulent-flow blade is parallel to the central axial line of the check valve.

Furthermore, the turbulent-flow blades are divided into two groups of a front group and a rear group, wherein the front turbulent-flow blade group is disposed on the front end of the flow guide body, and the rear turbulent-flow blade group is disposed on the rear end of the flow guide body.

The rotation directions of the two turbulent-flow blade groups are opposite, the front turbulent-flow blade group is near to the fluid inlet, the tangent lines of the front edges of the blades are parallel to the central axial line of the check valve, and the tangent line of the outlet of the front turbulent-flow blade group and the central axial line of the check valve form a first angle; while the tangent lines of the rear edges of the rear turbulent-flow blade group are parallel to the central axial line of the check valve, and the tangent line of the outlet of the rear turbulent-flow blade group and the central axial line of the check valve form a second angle; the first angel is equal to the second angle.

The front turbulent-flow blade group and the rear turbulent-flow blade group form an S-shaped flow passage.

Said shell comprises a sealing ring mounting groove, a cylindrical section and a flow guide body mounting groove, wherein the sealing ring mounting groove and the flow guide body mounting groove are respectively positioned at two ends of the shell, the cylindrical section is positioned at the middle part of the shell, and the inner wall of the cylindrical section is of a cylindrical surface and fitted with the upper end surface of the turbulent-flow blades.

Said cowl comprises a cowl body, a sealing surface fitted with the sealing ring, an end surface fitted with the flow guide body, and a shaft sleeve, wherein the cowl body is a revolving body with a generatrix of a smooth curve, the outer diameter of the end surface is equal to the outer diameter of the front end of the flow guide body, and the inner wall surface of the shaft sleeve is a cylindrical surface.

The invention provides a design of an inner passage type water-hammer proof and silent check valve capable of continuously eliminating water hammer. In the valve, two groups of axial flow blades acting as turbulent-flow blades are arranged in a flow passage (the blades are fixed on the outer surface of the streamline flow guide body), so that most pressure energy and kinetic energy are continuously converted into a torque to the flow guide body in the direction of surrounding the axial during the process of backflow liquid flowing through the turbulent-flow blades, and a pair of torques counteracting each other are formed as the turbulent-flow directions of the two groups of blades are opposite. The liquid pressure energy and kinetic energy are continuously and gradually converted to the torque to the flow guide body in the turbulent-flow blades, so that an abrupt impact to the valve by the water hammer is eliminated. Compared with a slow-closing type check valve and a damped check valve, the invention has the following advantages: first, the water hammer is divided gradually; second, the valve plate closes rapidly to prevent a part of water from flowing back into a pump; and third, the invention has simple structure and low manufacture cost.

DETAILED DESCRIPTION OF THE EMBODIMENT

The invention is further described by combining with the following drawings.

Figure 1:
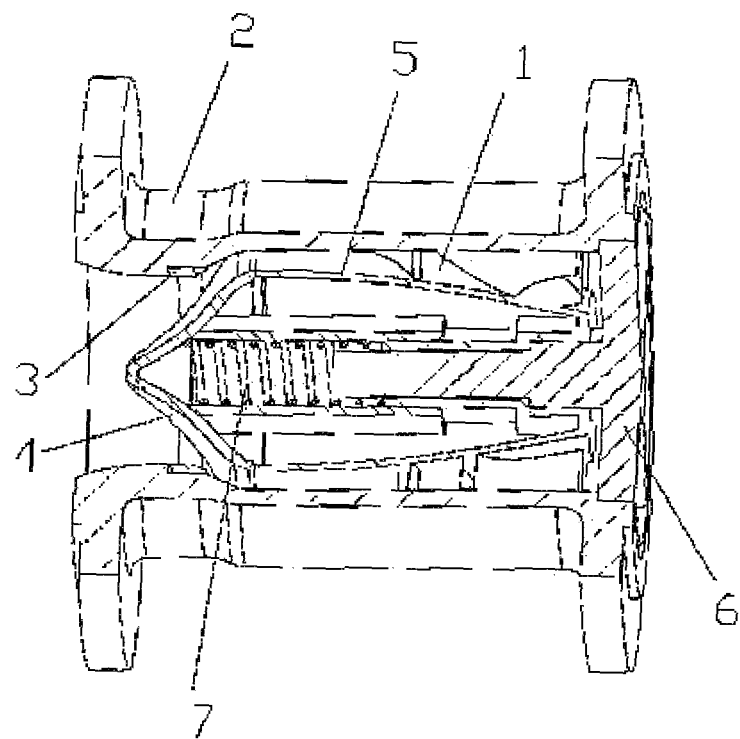
FIG. 1 is a structural diagram of the invention.

As shown in FIG. 1, the invention comprises a shell 2, a sealing ring 3, a cowl 4, a flow guide body 5, a support ring 6 and a spring 7 and is characterized in that turbulent-flow blades 1 are disposed on the outer surface of the flow guide body 5.

Figure 2:
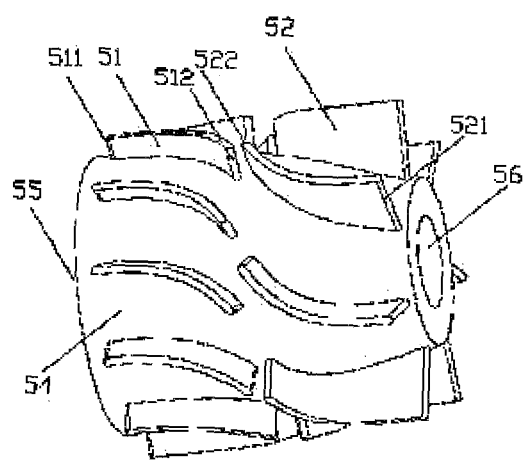
FIG. 2 is a structural diagram of the flow guide body of the invention.
Figure 3:
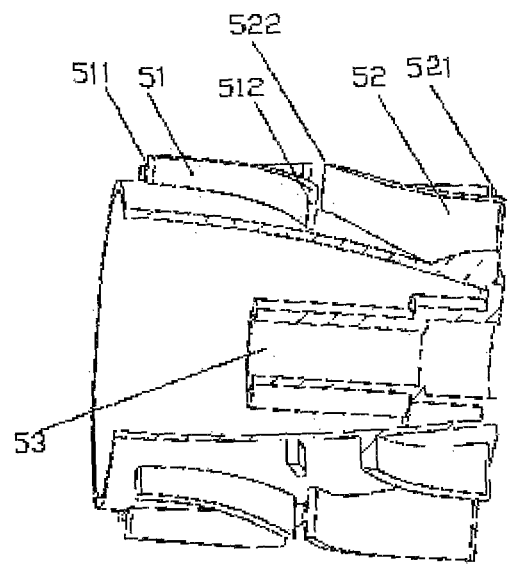
FIG. 3 is a sectional view of the flow guide body of the invention.

Referring to FIG. 2 and FIG. 3, the flow guide body 5 of the invention comprises a wheel hub 54, a rear blade group 52, a front blade group 51 and a shaft sleeve 53. The wheel hub 54 is of a revolving body with a large front end 55 and a small rear end 56 and having a generatrix of a circular arc, or an elliptical arc or other type of curve. Two blade groups 51 and 52 with opposite rotation directions are arranged on the wheel hub 54, wherein the front blade group 51 is near to a fluid inlet, the tangent line of the front edge of the front blade group is parallel to the axial line of the wheel hub 54, such that axial inflow can enter the front blade group 51 in the axial direction to prevent the inflow from impacting the front edges 511 of the blades. The tangent line of the rear edge 512 of the front blade group 51 and the axial line of the wheel hub 54 form an angle, the generatrix of the blades of the front blade group 51 can be a circular arc, an elliptical arc, or other type of curve. The tangent line of the front edges 521 of the rear blade group 52 is parallel to the axial line of the wheel hub 54, such that water hammer backflow can enter the rear blade group 52 in the axial direction to prevent the inflow from impacting the front edges 521 of the blades. The tangent line of the rear edges 522 of the rear blade group 52 and the axial line of the wheel hub 54 form an angle, the generatrix of the blade of the rear blade group 52 can be a circular arc, or an elliptical arc, or other type of curve. The intersection angle between the rear edges 512 of the front blade group 51 and the axial line is equal to the intersection angle between the rear edges 522 of the rear blade group 52 and the axial line, such that liquid can smoothly enter a blade group from the other blade group to avoid water hammer. The two blade groups 51 and 52 form an "S" shaped flow passage, so that when water enter through the two groups of flow passages, two torques to wheel hub 54 are induced with opposite directions, thus the two torques are counteracted. The two blade groups 51 and 52 are curved plates along the normal of the wheel hub 54. With the flow passage of the above mentioned structure, when water hammer backflow passes through the two blade groups 51 and 52, most part of the fluid energy convert into force that is perpendicular to the axial line of the wheel hub 54, and the force gradually increases in the direction that is perpendicular to the axial line, instead of concentrates to impact a valve clack along the axial line of the wheel hub 54.

Figure 4:
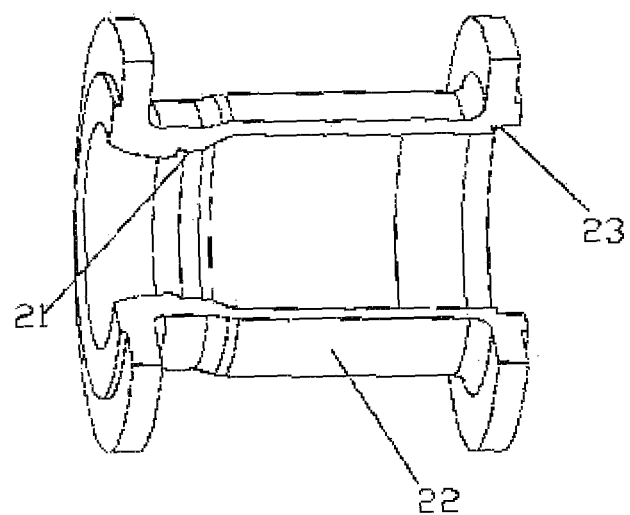
FIG. 4 is a structure diagram of the shell of the invention.

The shell 2, as shown in FIG. 4, comprises a sealing ring mounting groove 21, a cylindrical section 22 and a support ring mounting groove 23, and is characterized in that the middle part of the shell is the cylindrical section 22, the inner wall of the cylindrical section is also a cylindrical surface used for being fitted with the upper end surfaces of the two blade groups 51 and 52 of the flow guide body 5.

Figure 5:
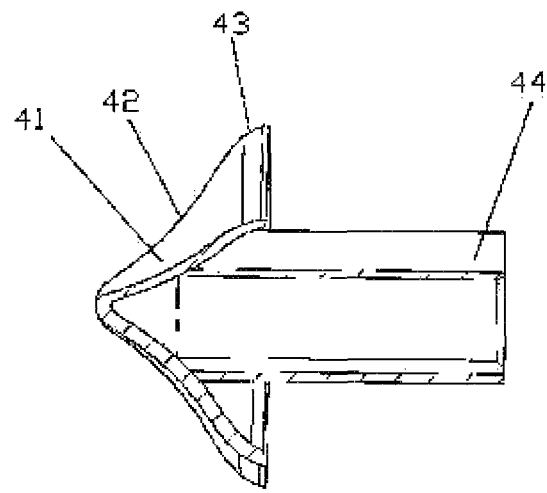
FIG. 5 is a structure diagram of the cowl of the invention.

FIG. 5 shows the structure of the cowl 4 which comprises a cowl body 41, a sealing surface 43 fitted with the sealing surface of the sealing ring 3, an end surface 45 fitted with the front end 55 of the wheel hub, and a shaft sleeve 44 fitted with the hub shaft sleeve 53. Said cowl body 41 is a revolving body with a generatrix 42 of a smooth spline curve, such that fluid can smoothly enter the valve body. Said sealing surface 43 is a part of the cowl body 41. The outer diameter of the end surface 45 is equal to the outer diameter of the front end 55 of the hub, and when the end surface 45 is tightly attached on the front end 55 of the wheel hub, the generatrix 42 coincides with the generatrix of the wheel hub 5 at the tangent line of the attaching position. The inner wall surface of the shaft sleeve 44 is of a cylindrical surface, and can slide along the outer cylindrical surface of the hub shaft sleeve 53. The spring 7 is disposed between the shaft sleeve 44 and the hub shaft sleeve 53.

Figure 6:
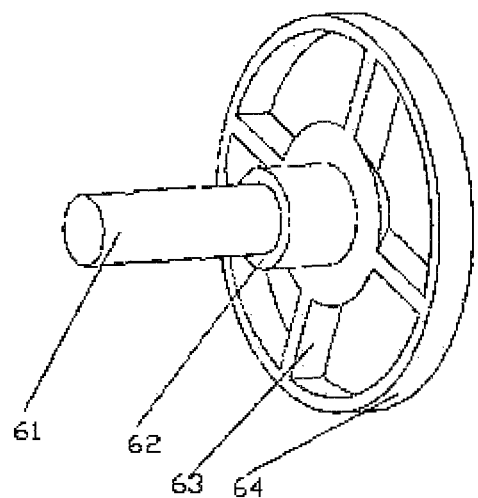
FIG. 6 is a structural diagram of the support frame of the invention.

FIG. 6 shows the structure of the support frame 6 which comprises a support ring 64, a support plate 63, a hub baffle ring 62 and a shaft 61. Said support ring 64 is mounted in the support ring mounting groove 23 of the shell 2. Said support plate 63 is formed by several flat sheets that is radiated from the axial line. Said shaft 61 is fitted with the inner wall surface of the hub shaft sleeve 53, and there is no relative motion between them.

The invention has the following working process:

When a pump valve is opened, fluid pressure acts on the cowl 4, presses the spring 7 and pushes away the cowl 4, such that the end surface 45 of the cowl 4 coincides with the front end 55 of the wheel hub, and the fluid flows into the valve along the axial direction of the valve and flows out of the valve. When a downstream valve is closed or a front-end pump is suddenly closed, the pressed spring 7 springs back because of water break in the valve, and the cowl 4 towards the sealing ring 3 are pressed before pressure waves of water flow return. The returned pressure waves enter the valve along the front edges 521 of the rear blade group 52, and when the liquid flows through the two blade groups 51 and 52, water hammer energy of the liquid is gradually transferred to the wheel hub 54 by the blades such that the hub 54 has torsional deformation in the opposite direction. That is to say, the water hammer energy is gradually converted into torsional deformation energy of the whole valve, thereby greatly reducing the centralized impact of water hammer energy to the valve in the axial direction.

The invention claimed is:

1. An impeller type water-hammer proof and silent check valve including a shell, a sealing ring, a cowl, a flow guide body and a spring, wherein turbulent-flow blades are arranged on an outer surface of the flow guide body, wherein at least one turbulent-flow blade is a sheet body having a cross section of a curve, and wherein the at least one turbulent-flow blade is in the shape of an "S".

2. The impeller type water-hammer proof and silent check valve as claimed in claim 1, wherein several turbulent-flow blades are arranged and evenly distributed on the outer surface of the flow guide body.

3. The impeller type water-hammer proof and silent check valve as claimed in claim 1, wherein a direction of two ends of the at least one turbulent-flow blade is parallel to a central axial line of the check valve.

4. An impeller type water-hammer proof and silent check valve including a shell, a sealing ring, a cowl, a flow guide body and a spring, wherein turbulent-flow blades are arranged on an outer surface of the flow guide body, wherein the turbulent-flow blades comprise two groups which are a front group and a rear group, wherein the front turbulent-flow blade group is disposed at a front end of the flow guide body, and the rear turbulent-flow blade group is disposed at a rear end of the flow guide body, and wherein rotation directions of the two groups of the turbulent-flow blades are opposite, and the front turbulent-flow blade group is near to a fluid inlet, and tangent lines of its front edges are parallel to a central axial line of the check valve, and a tangent line of an outlet of the front turbulent-flow blade group and the central axial line of the check valve form a first angle, while tangent lines of rear edges of the rear turbulent-flow blade group are parallel to the central axial line of the check valve, and a tangent line of an outlet of the rear turbulent-flow blade group and the central axial line of the check valve form a second angle, and the first angle is equal to the second angle.

5. The impeller type water-hammer proof and silent check valve as claimed in claim 4, wherein the front turbulent-flow blade group and the rear turbulent-flow blade group form a "S" shaped flow passage.

6. The impeller type water-hammer proof and silent check valve as claimed in claim 1, wherein the shell comprises a sealing ring mounting groove, a cylindrical section and a flow guide body mounting groove, wherein the sealing ring mounting groove and the flow guide body mounting groove are respectively positioned at two ends of the shell, wherein the cylindrical section is positioned at a middle part of the shell, and its inner wall is of a cylindrical surface and fitted with an upper end surface of the turbulent-flow blades.

7. The impeller type water-hammer proof and silent check valve as claimed in claim 1, wherein the cowl comprises a cowl body, a sealing surface fitted with the sealing ring, an end surface, fitted with the flow guide body, and a shaft sleeve, wherein the cowl body is a revolving body with a generatrix of a smooth curve, wherein an outer diameter of the end surface is equal to an outer diameter of a front end of the flow guide body, wherein an inner wall surface of the shaft sleeve is a cylindrical surface.

\* \* \* \* \*

UNITED STATES PATENT AND TRADEMARK OFFICE
CERTIFICATE OF CORRECTION

PATENT NO.         : 9,091,356 B2
APPLICATION NO.    : 13/320434
DATED              : July 28, 2015
INVENTOR(S)        : Jiyue Yang It is certified that error appears in the above-identified patent and that said Letters Patent is hereby corrected as shown below:

In the specification, column 1, FIELD OF INVENTION, line 16-18, "The invention belongs to the filed field of check valve manufacture, particularly relates to an impeller type water-hammer proof and silent check valve." should read --The invention belongs to the field of check valve manufacture, particularly relates to an impeller type water-hammer proof and silent check valve--.

Signed and Sealed this
Twenty-eighth Day of June, 2016

Michelle K. Lee
*Director of the United States Patent and Trademark Office*